Oct. 22, 1968 J. MANTELET 3,406,730
DEVICE ALLOWING FOODSTUFFS TO BE SUPPLIED
IN THE FORM OF SLICES
Filed June 27, 1966 3 Sheets-Sheet 1
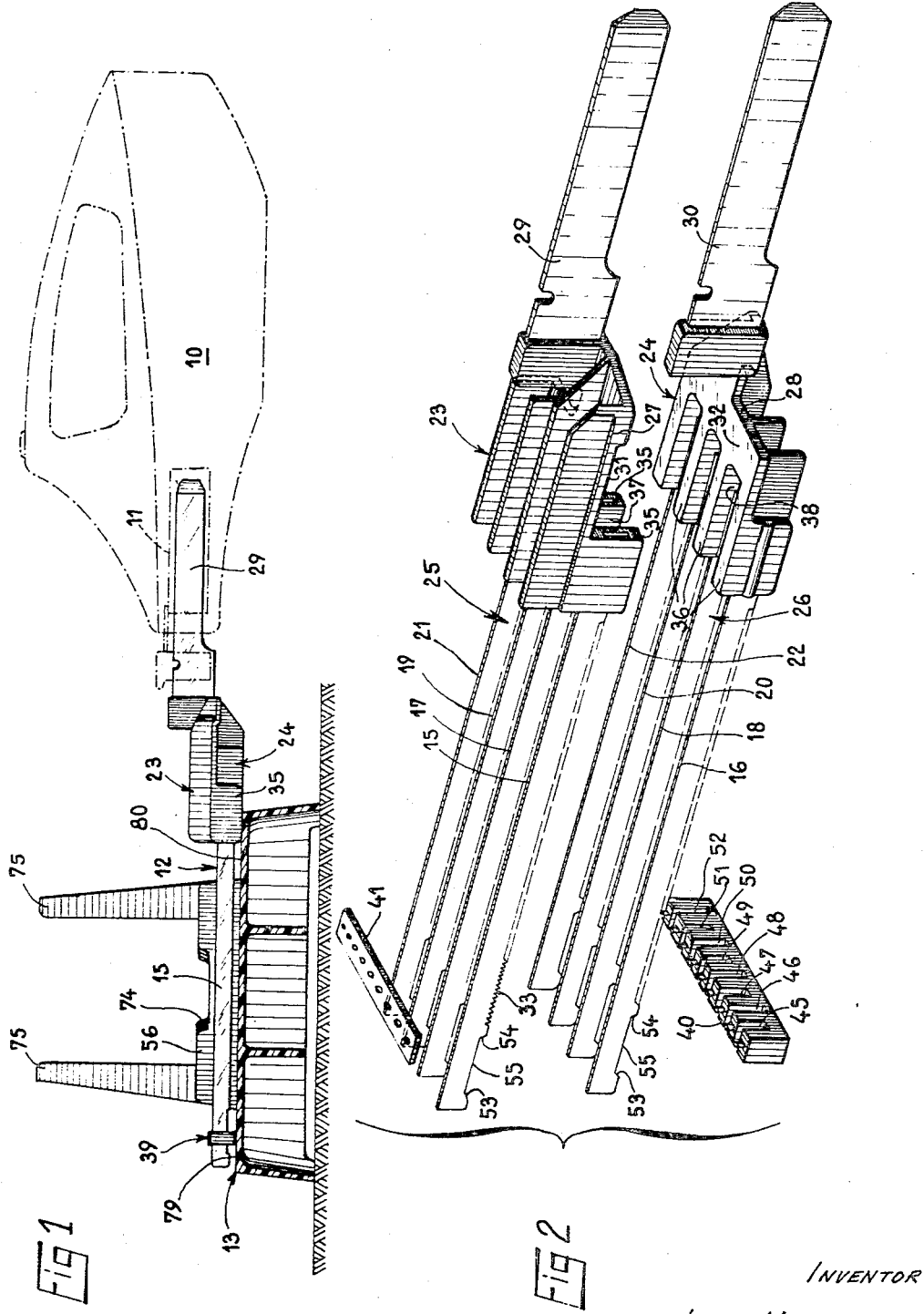
INVENTOR
JEAN MANTELET
BY Young & Thompson
ATTYS.

Oct. 22, 1968  J. MANTELET  3,406,730
DEVICE ALLOWING FOODSTUFFS TO BE SUPPLIED
IN THE FORM OF SLICES
Filed June 27, 1966  3 Sheets-Sheet 2

INVENTOR
JEAN MANTELET
By Young & Thompson
ATTYS.

Oct. 22, 1968     J. MANTELET     3,406,730
DEVICE ALLOWING FOODSTUFFS TO BE SUPPLIED
IN THE FORM OF SLICES
Filed June 27, 1966     3 Sheets-Sheet 3
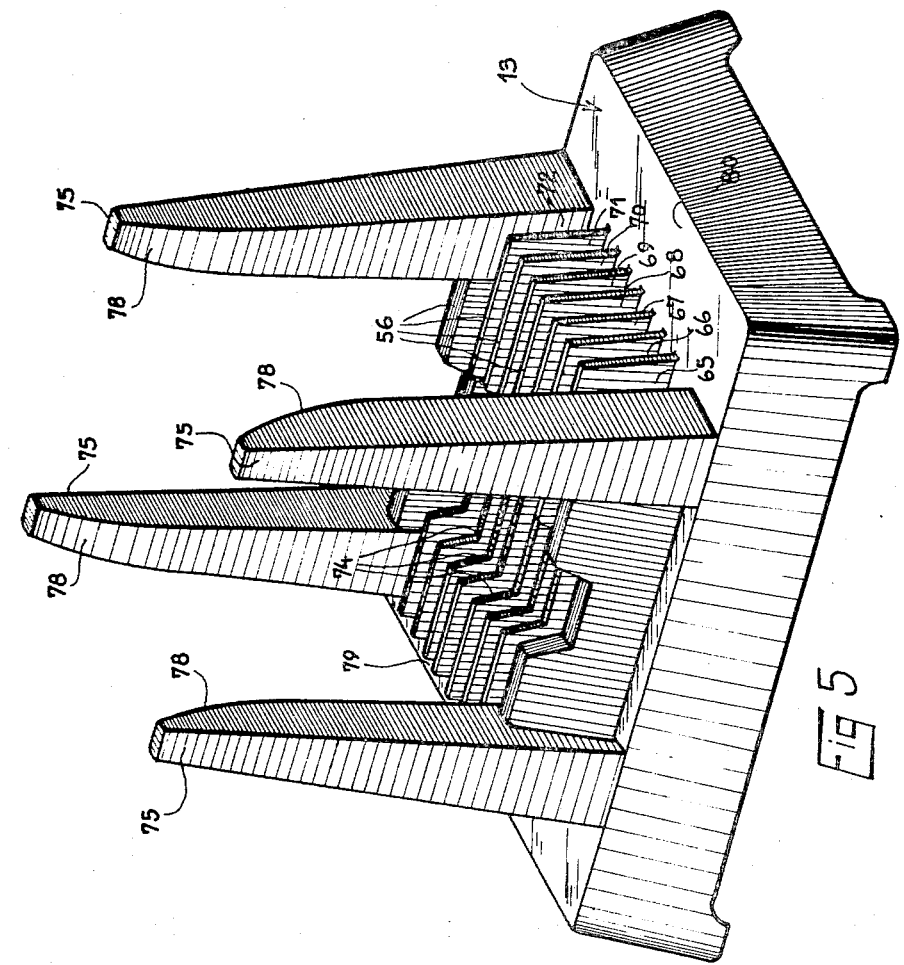
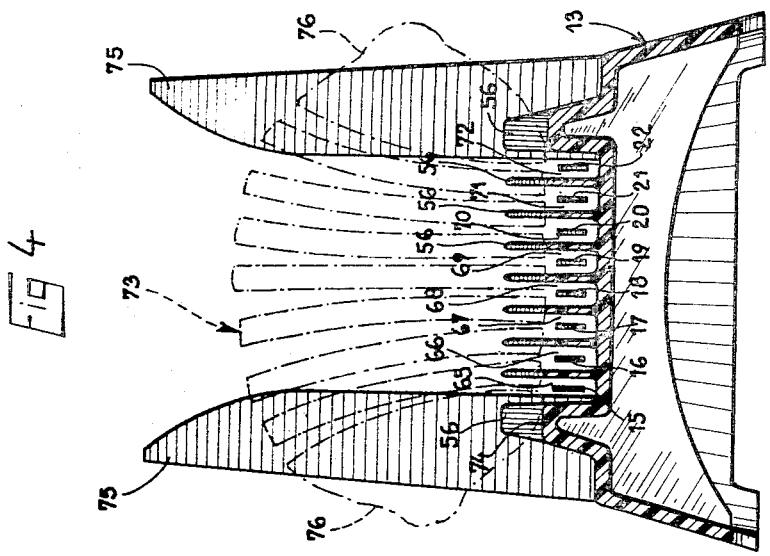
INVENTOR
JEAN MANTELET
By Young & Thompson
ATTYS.

United States Patent Office 3,406,730
Patented Oct. 22, 1968

3,406,730
DEVICE ALLOWING FOODSTUFFS TO BE SUPPLIED IN THE FORM OF SLICES
Jean Mantelet, 46–48 Ave. Montaigne,
Paris, 8eme, France
Filed June 27, 1966, Ser. No. 560,748
Claims priority, application France, Jan. 26, 1966,
47,233
6 Claims. (Cl. 146—2)

ABSTRACT OF THE DISCLOSURE

A slicing tool adapted to be driven by the sliders of the driving unit of a conventional carving knife, comprising two frames disposed in sliding contact and each having an element shaped for coupling to each said slider. Each frame supports a set of spaced blades disposed with the blades of one set arranged alternately with the blades of the other set, enabling the blades of each set to be reciprocated with the blades of one set moving in the opposite direction from the blades of the other set.

---

This invention relates to a slicing tool and a slicing device for slicing materials such as vegetables, fruit, hard-boiled eggs, sausage, meat and crustless bread, and adapted to be driven by the driving unit of an electric device such as a carving knife of conventional type, which at its output comprises two parallel sliders displaceable alternately in opposite directions and normally intended to receive two blades of an electric carving knife.

According to the present invention a slicing tool comprises a food or like slicing device adapted to be driven by a driving unit which at its output has two parallel sliders displaced alternately in opposite direction, said tool comprising two slider frames, a set of spaced parallel blades secured to each frame, an element on each frame shaped to engage one of said sliders to be reciprocated thereby, the frames being disposed with the blades of one set alternating with the blades of the other set enabling the blades of one set to be reciprocated while the blades of the other set are reciprocated in the opposite direction to the blades of the other set.

The two sets of blades are thus driven alternately in opposite directions by the driving unit of the electric carving knife, in such manner that by lowering the slicing tool thus formed on to an object to be sliced, such as fruit, vegetable or hard-boiled egg, a row of parallel slits may be made in this object by a simple movement, that is to say cutting a row of slices.

According to another feature of the invention, a slicing device comprises, in addition to the multiblade slicing tool, a board for supporting the material to be sliced, the board on its upper face having grooves between parallel fins or webs for supporting the said material and adapted to receive the blades during the final stage of the downward displacement of the tool through the said material.

The grooves of the board are preferably of a depth at least equal to the height of the blades so that at the end of the downward displacement of the blades into the grooves, the blades may issue completely from the slits made between the slices whilst these slices remain supported on the edges of the fins or webs.

In order that the invention may be more fully understood an embodiment in accordance therewith will now be described by way of example, with reference to the accompanying drawings, in which:

FIG. 1 is a view of a device partly in vertical cross-section;

FIG. 2 is an exploded perspective view of the slicing tool forming part of the device of FIG. 1;

FIG. 4 is a vertical cross-section along the line IV—IV of FIG. 3; and

FIG. 5 is a perspective view of the board for supporting the object to be sliced.

Figure 3:
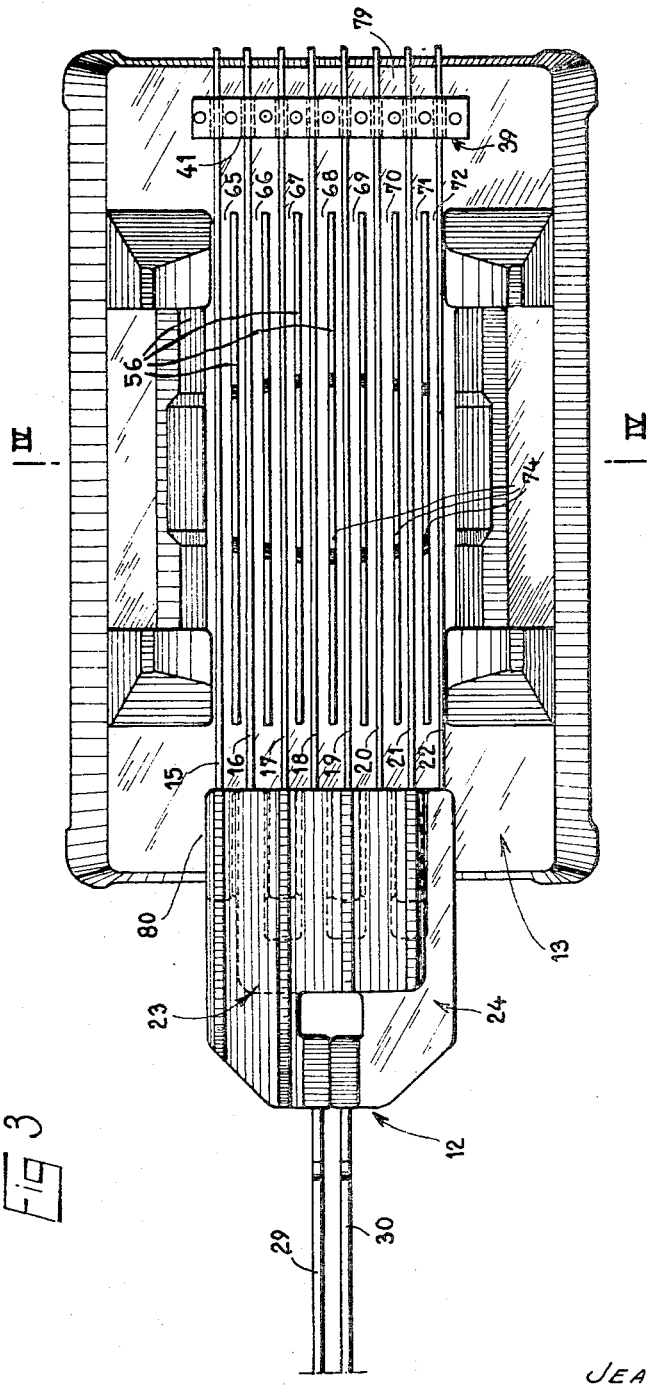
FIG. 3 is a plan view of the device of FIG. 1.

The device shown in the drawings is adapted to be driven by a driving unit 10 (FIG. 1) of an electric carving knife of conventional type. At its output, this driving unit 10 in manner known per se comprises two parallel sliders 11 (of which only one is shown in the drawing), which are displaceable alternately in opposite directions and normally receiving two blades of an electrically operated carving knife.

The device comprises a slicing tool 12 and a board 13 for supporting the foodstuffs to be sliced.

The slicing tool 12 is formed by a row of eight blades, 15 to 22, arranged in parallel spaced vertical planes. The odd-numbered blades 15, 17, 19, 21 of this row are rigidly connected to a frame 23 adapted for coupling to one of the sliders 11, and the even-numbered blades 16, 18, 20, 22 are rigidly connected to another frame 24 adapted for coupling to the other slider 11. The two sets 25 and 26 of odd and even numbered blades are thus driven alternately in opposite direction by the driving unit 10 of the electric carving knife so that by lowering the multiblade tool on to an object to be sliced, such as a fruit, vegetable or hard-boiled egg, a series of parallel slits may be cut in this object by a simple movement.

The frames 23 and 24 are formed by two corresponding horizontal plates 27 and 28. The plate 27 carries the blades 15, 17, 19, 21 on its front edge and on its rear edge has a coupling lug or tongue 29 for engagement in the corresponding slider 11. Analogously, the plate 28 carries the blades 16, 18, 20, 22 at one side, and at the other side has a coupling tongue 30 engaging in the other slider 11. The plates 27 and 28 are slidingly arranged on each other, the lower face of the plate 27 having a smooth horizontal portion 31 slidable on a smooth horizontal portion 32 of the upper face of the plate 28.

The lower cutting edges of the blades carry fine serrations as at 33 (FIG. 2), and are all situated in the same horizontal plane (FIG. 4).

The blades of the set 25 are secured to projections 35 of the plate 25 which moulded over them, and the blades of the set 26 are similarly secured in projections 36 of the plate 24. The projections 35 and 36 are parallel to the blades. The recess 37 between two adjacent projections 35 forms a guiding passage in which slides one of the projections 36, and the recess 38 between two adjacent projections 36 forms a passage for one of the projections 35. It will be noted that the projections 35 and 36 are downwardly extended to a level beneath the horizontal plane containing the bottom cutting edges of the blades (FIG. 1).

The relative spacing of the front extremities of the blades is maintained by a horizontal cross-piece 39 fastened to the blades of the set 25 and having passages in which the blades of the set 26 can slide freely. This cross-piece 39 comprises a bar or rod of rectangular cross-section 40 whose upper face has a series of slots 45 to 52 adapted to receive the corresponding blades 15 to 22. This bar 40 is secured to a small plate 41 for holding the blades. The slots 45, 47, 49, 51 co-operate with the small plate 41 to exert a tight grip on the blades 15, 17, 19, 21 of the set 25, so that the cross-piece 39 is locked on these blades. By contrast, the slots 46, 48, 50, 52 are deeper so that the blades 16, 18, 20, 22 of the set 26 can slide freely in the cross-piece 39.

The bottom edge of each blade has a pair of abutments 53 and 54 at either side of the cross-piece and appropriately spaced apart therefrom; in the drawings these abutments are formed by the sides of a notch 55 made in the edge of the blade. The front abutments 53 prevent the blades from leaving the cross-piece 39, for example when cleaning the tool. The rear abutments 54 ensure that the cross-piece cannot be displaced as far as the toothed working part of the blades when handling the tool.

With the board, associated with the above described multiblade slicing tool 12, it is possible to separate completely the slices cut by the tool. This board has parallel fins or webs 56 to support the object to be sliced. Between these fins are grooves 65 to 72 for receiving the blades 15 to 22 with substantial tolerance during the final stage of the downward movement of the tool through the object to be sliced, e.g. a lemon (dash-dotted in FIG. 4).

The crests of the fins are notched along their median portion as at 74, to form a seat for the object to be sliced. The height of the fins along the hollow notches 74 is however greater than the height of the blades of the tool so that at the end of the downward movement of the blades in the grooves 65 to 72, the blades may be extracted completely from the slits between the slices, but the slices remain on the crests of the fins 56.

The board 13 has two posts 75 at each side, which are spaced apart sufficiently for each extremity 76 of the object 73 to be sliced to pass freely between them. The inner faces of these posts form guides which cooperate with the outer blades 15 and 22 of the tool to ensure that all the blades are positioned in alignment with the corresponding grooves 65 to 72 of the board. The upper portions of these inner faces of the posts are rounded off or sloped as shown at 78 to form guide ramps for the insertion of the outer blades of the tool.

The upper face of the board 13 has two smooth horizontal bearing surfaces 79 and 80 respectively at the front and rear ends of the board and on which may be placed in abutment, respectively, the lower face of the cross-piece 39 of the tool blades, and the bottom edges of the projections 35 and 36 of the tool frames. This arrangement ensures that the toothed cutting edges of the blades cannot come in contact with the bottom of the grooves 65 to 72, which might damage them.

What I claim is:

1. A slicing tool for soft materials such as eggs and fruit, said tool comprising two frames disposed in sliding contact, a set of spaced blades secured to each said frame, said blades having cutting edges, and an element on each said frame shaped for coupling to a slider of a driving unit, said frames being disposed with the cutting edges of all the blades substantially in the same plane and with said set of blades of one frame arranged alternately with said set of blades of said other frame enabling the blades of each set to be reciprocated with the blades of one set moving in the opposite direction from the other set, said blades of each said set being secured to projections on its said frame and extending substantially parallel to said blades of said set, said projections on one said frame being slidably located in recesses in said other frame.

2. A slicing tool according to claim 1, wherein said projections of both said frames extend below the plane containing the cutting edges of all said blades.

3. A slicing tool according to claim 1, wherein towards the free end of one of said sets of blades a crosspiece is secured to said blades, said crosspiece having passages between said blades in which said blades of said other set slide freely, at least one of the upper or lower edges of each of said blades having a pair of abutments disposed one in front of and one behind said crosspiece.

4. A slicing tool for soft materials such as eggs and fruit, said tool comprising two frames disposed in sliding contact, a set of spaced blades secured to each said frame, said blades having cutting edges, an element on each said frame shaped for coupling to a slider of a driving unit, said frames being disposed with the cutting edges of all the blades substantially in the same plane and with said set of blades of one frame arranged alternately with said set of blades of said other frame enabling the blades of each set to be reciprocated with the blades of one set moving in the opposite direction from the other set, a board for supporting said material to be sliced, and parallel webs on the upper face of said board with grooves between them to receive said blades, the crests of said webs being notched in their central portions to form a seat for said material to be sliced.

5. A slicing tool according to claim 4, wherein the remaining portions of said webs below said notches are at least equal in height to said blades.

6. A slicing tool according to claim 4, wherein said board has two posts at each side spaced apart to receive said material to be sliced between them and forming guides for the free ends of said blades.

References Cited

UNITED STATES PATENTS

| | | | |
|---|---|---|---|
| 2,592,657 | 4/1952 | Cierley | 83—647 X |
| 3,212,376 | 10/1965 | Berenbak et al. | 83—4 |
| 3,245,447 | 4/1966 | Jones | 146—153 |

JAMES M. MEISTER, *Primary Examiner.*